United States Patent [19]

McNutt

[11] 4,182,103
[45] Jan. 8, 1980

[54] WINDOW TUCKER WHEELS

[76] Inventor: Darrell A. McNutt, Hwy. 70 East, Soper, Okla. 74759

[21] Appl. No.: 816,514

[22] Filed: Jul. 15, 1977

[51] Int. Cl.² ............................................. A01D 43/02
[52] U.S. Cl. ........................................ 56/364; 56/15.8; 56/377
[58] Field of Search ............... 56/364, 377, 328 R, 56/15.7, 15.8, 341

[56] References Cited

U.S. PATENT DOCUMENTS

| | | | |
|---|---|---|---|
| 2,459,961 | 1/1940 | Pollard | 56/377 |
| 2,783,606 | 3/1957 | Wilson | 56/364 |
| 2,859,578 | 11/1958 | Hall | 56/15.7 |
| 2,926,481 | 3/1960 | Van der Lely et al. | 56/377 |
| 2,982,081 | 5/1961 | Cooley | 56/377 |
| 3,125,845 | 3/1964 | Lee | 56/364 |
| 3,678,669 | 7/1972 | Czajkowski | 56/364 |
| 3,884,019 | 5/1975 | Gerzanich | 56/15.8 |

FOREIGN PATENT DOCUMENTS

389308 3/1965 Switzerland .............................. 56/377

Primary Examiner—Jay N. Eskovitz
Attorney, Agent, or Firm—Head, Johnson & Chafin

[57] ABSTRACT

Tucker wheelers for use on a hay baler in which hay is picked up from a window in the field, the tucker wheels being mounted on each side of the hay baler, the planes of the wheels being at an acute angle to the longitudinal axis of the hay baler. Each of the tucker wheels comprises a rotating wheel carrying radial wire spokes extending outwardly from the circumference, the spokes being attached to springs so that they can deflect through a wide angle. Each wheel is mounted at an elevation so that the spokes will engage the earth, and the wheel will rotate as the vehicle moves, picking up hay from the outer edges of the window and moving it towards the center of the windrow. Each wheel is attached to the baler with a universal joint mount allowing for use on uneven ground and allowing the wheel to caster when the hay baler is backed up.

4 Claims, 3 Drawing Figures

WINDOW TUCKER WHEELS

BACKGROUND OF THE INVENTION

1. Field of the Invention

This invention lies in the field of hay baling apparatus. More particularly, it concerns apparatus such as is common in the art, for driving along and over a windrow of hay, and picking up the hay and rolling it into a large cylindrical bale.

Still more particularly, the invention consists of a device for attachment to such a hay baler that operates to move hay from the edges of a windrow towards the center of the windrow.

2. Description of the Prior Art

The present method of baling hay with a round baler requires the producer to first cut the hay and allow it to cure. Next, he rakes it into windrows using a side delivery rake. Ideally, the windrow is rectangular in cross-section and of width just slightly less than the width of the hay baler. However, wind erosion tends to flatten the windrow at the outer edges, widening the windrow and making it semi-oval or semi-elliptical in cross-section. To make certain that the width of a windrow is sufficiently narrow so that all the hay is picked up by the hay baler as presently used, the windrow is made narrower than the full width of the baler. Hay balers of the type in present use do not have any mechanism to distribute the hay longitudinally once it is picked up by the hay baler preparatory to rolling it into a cylindrical bale. Therefore, the operators of round bale hay balers at the present time first provide narrow windrows to make sure that all the hay is picked up by the bale, then to insure the production of a cylindrical bale drive the baler, or more precisely, the tractor pulling the hay baler in a zig-zag path so that all the hay is picked up from the windrow and distributed across the width of the baler. If the hay baler is pulled straight along a semi-elliptical cross-sectional windrow the bale formed will be larger in diameter and more compact in the middle and smaller in diameter and less dense at the ends.

The present invention provides tucker wheels which are attached to a hay baler enabling the baler to pick up hay from a wider windrow and to reform a wind eroded or semi-elliptical windrow into one which is more rectangular in cross-section to thereby provide a better shaped cylindrical bale without the driver of the hay baler having to zig-zag as he pulls the baler down a windrow.

SUMMARY OF THE INVENTION

It is a primary object of this invention to provide apparatus for attachment to a hay baler for reshaping a windrow and where the windrow is wider than the width of the baler, to move hay in the windrow to a width which is picked up by the baler.

It is a further object of this invention to provide a pair of tucker wheels which are attached to a hay baler and which are driven by contact with the earth, as the baler rolls along the windrow, to pick up hay along the lateral edges of the windrow, and move it towards the middle, so as to effectively reduce the width of the windrow to a value less than the width of the hay baler.

These and other objects are realized and the limitations of the prior art are overcome in this invention by providing a pair of tucker wheels which are mounted one on each side of the hay baler. The tucker wheels comprise a journalled wheel the plane of which is vertical and set at a selected acute angle with the longitudinal axis of the baler and the windrow. Each of the wheels has a large plurality of circumferentially spaced, substantially radial, wire spokes which are spring supported so that they can deflect easily. The wheels are universally mounted so that the spokes penetrate a slight distance into the earth and rotate the wheel as the vehicle moves along the windrow. The spokes engage the hay along the edges of the windrow, and carry the hay inwardly to reform and reshape the windrow for superior baling results.

A push off bar is also provided along the plane of the spokes of each tucker wheel to remove whatever hay may be entangled in the spokes and to drop it inside of the width of the vehicle. This arrangement permits the use of smaller diameter tucker wheels to move conveniently fit the space limitation on commercial balers.

BRIEF DESCRIPTION OF THE DRAWINGS

These and other objects and advantages of this invention and a better understanding of the principles and details of the invention will be evident from the following description taken in conjunction with the appended drawings in which:

FIG. 3 is a side view taken along the plane 3—3 of FIG. 2 and showing details of construction of the tucker wheels.

DESCRIPTION OF THE PREFERRED EMBODIMENT

As previously pointed out, a problem with existing hay balers used to gather hay into compacted large cylindrical bales is the problem of providing uniform bales. Using the present invention, the operator can provide windrows of hay of somewhat greater width than the normal width of the baler. By using a pair of tucker wheels to be described, the wider windrow is reshaped and reformed at the edges to move a more even distribution of hay into the baler as it is pulled down the windrow.

Figure 1:
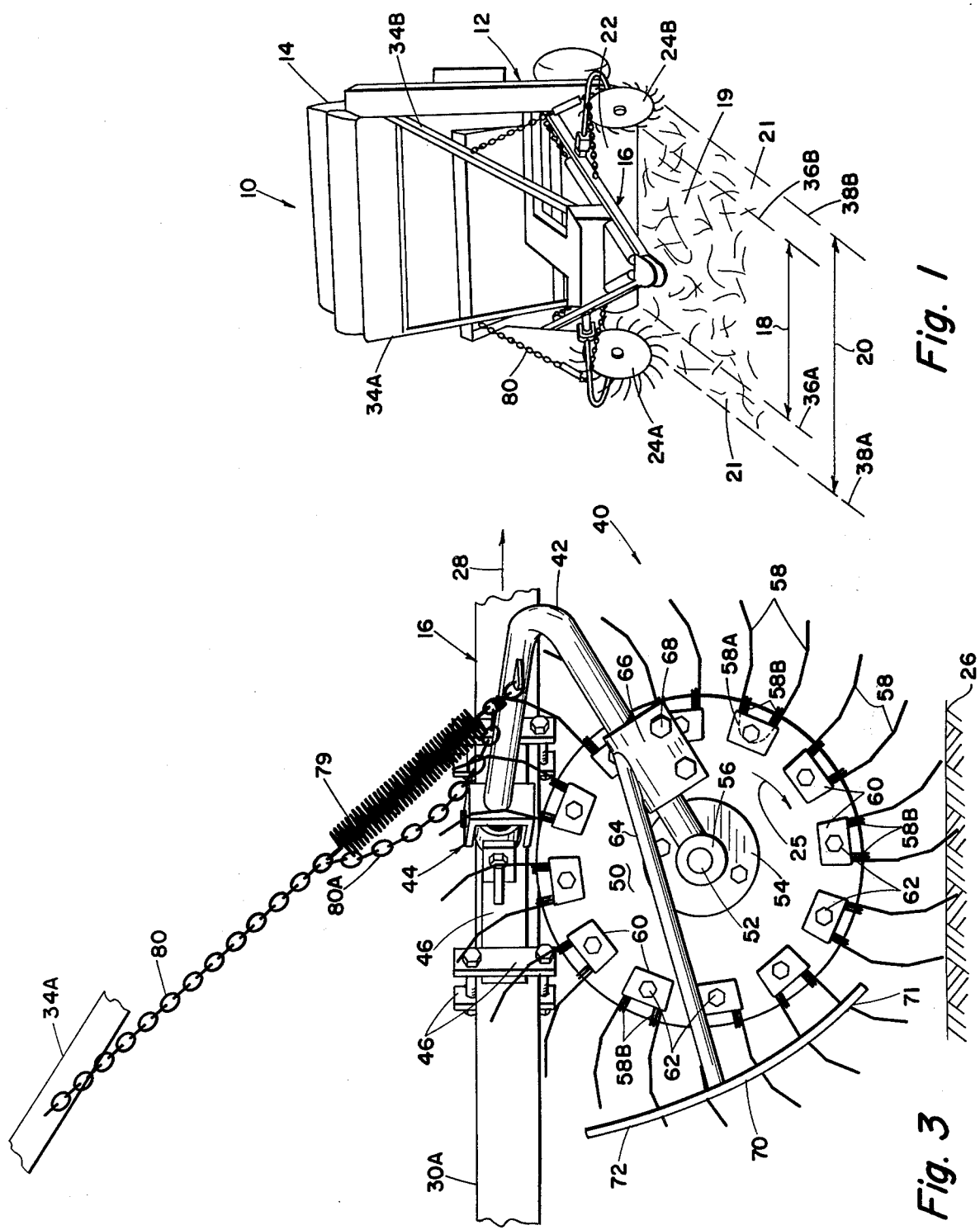
FIG. 1 is a general view of the tucker wheels in relationship to the hay baler positioned over a windrow.

Referring now to the drawings and in particular to FIG. 1, there is shown in schematic outline a conventional commercial hay baler and apparatus illustrated by the numeral 10, for picking up hay 19 in a windrow of lateral width 20. The vehicle is generally pulled by means of a tractor or other power device, and comprises means for pickng up hay from the windrow and balling it into a large cylindrical bale. The apparatus indicated generally by the numeral 12, which is used for creating the bale, will not be described since it is a commercial device and is well known in the art. The important thing is that the effective width of the collection apparatus is of a selected magnitude indicated by the numeral 18 and picks up hay within dashed lines 36A and 36B. The effective width of the windrow is usually wider, using the technique made possible by this invention, as indicated by the numeral 20 so that hay within dashed lines 38A and 38B will be picked up.

It is an object of this invention to provide a means which can be attached to the vehicle 12, such as the tucker wheels 24A and 24B, which are adapted to turn and roll along the ground with their planes at an acute angle to the longitudinal axis of the vehicle, and the windrow, so as to pick up and move hay inwardly in the lateral margins 21, and to pick it up and move it towards the central part 19 of the windrow to thereby reform the windrow and move hay in a more evenly distributed manner into the rotary retrieving mechanism 22 of the baler 14.

The tucker wheels 24 are shown in relation to the baler in FIG. 1 and will be described more fully in detail, in connection with FIGS. 2 and 3. They are supported from a triangular draw bar or tongue, indicated generally by the numeral 16, and which is itself supported by longitudinal sloping members 34a and 34b.

Figure 2:
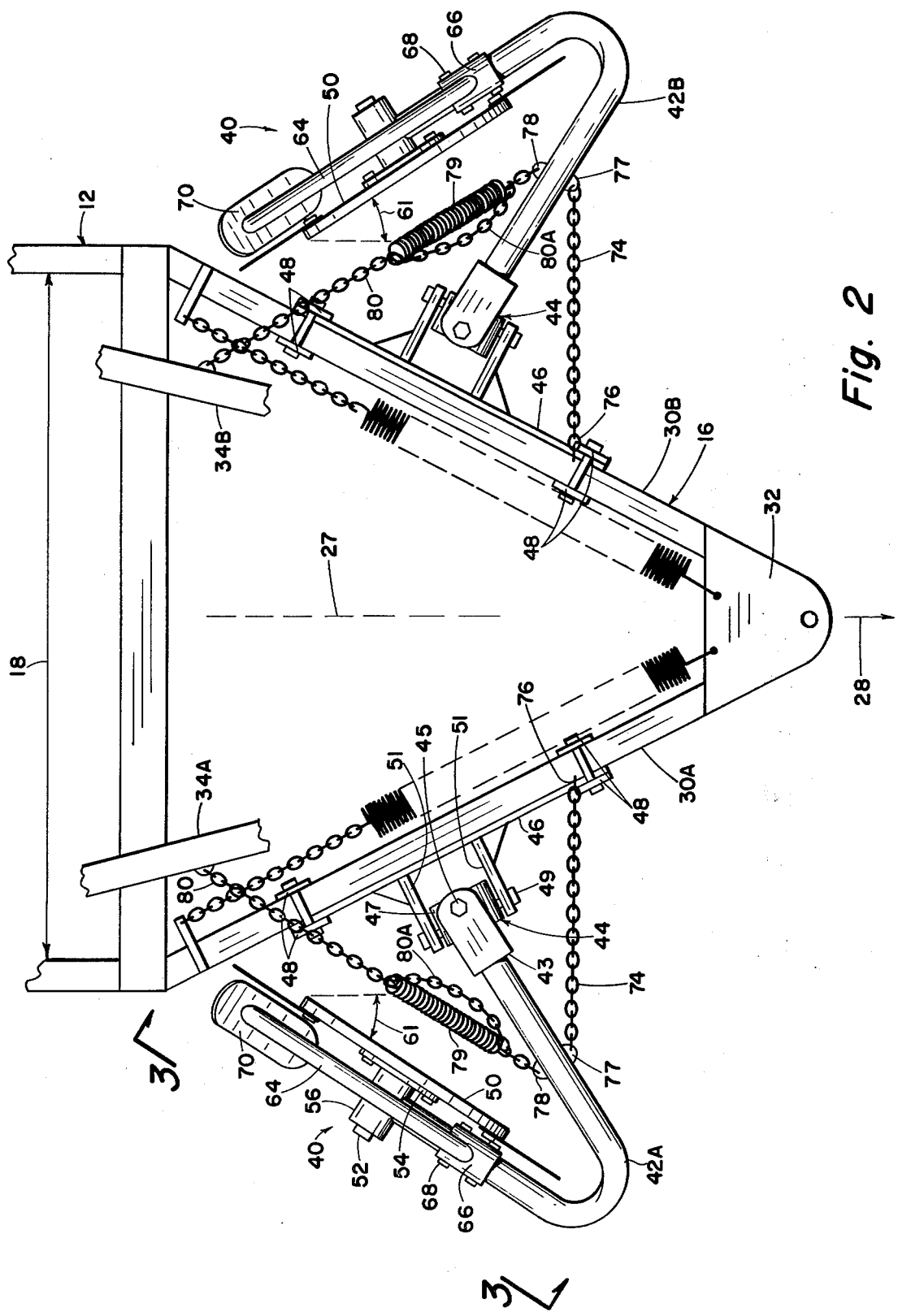
FIG. 2 is a plan view of the front end of the baler showing the disposition of the tucker wheels in relation to the baler.

Referring now to FIGS. 2 and 3 there is shown in FIG. 2 a plan view of the front portion of the baler 12, indicating an internal width dimension 18, of the hay pick up apparatus. The draw bar 16 is of a triangular shape, having two members 30a and 30b joined at the front by a plate 32 to which is attached a draw bar of a powered vehicle.

The tucker wheels are indicated generally by the numeral 40, one on each side of the vehicle. Each one is mounted on a frame 42 which comprises a rod or bar bent in an angular shape. One end of it is supported from the draw bar by means of a universal joint indicated generally by the numeral 44, which is an important part of the invention. The second end carries a bearing assembly which rotatably supports the stub shaft 52 of the tucker wheel 50. The purpose of the universal joint 44 is to provide a means for adjusting the elevation of the wheel above the ground, and the angle of the frame and in addition to permit the tucker wheels to caster, or freely swing inwardly, when the baler is backed up. The elevation is accomplished by means of a chain 80 which is attached at the upper end to the support bar 34 and at the second end to a fastening 78 on the frame 42. There is a loop of chain 80A which bypasses around a coiled spring 79, so that the frame 42 is supported by the spring up to a certain point of extension, where the loop 80A comes into effect, to limit any further extension of the supporting member 80.

The angle of the plane of the tucker wheel with respect to the longitudinal axis of the vehicle and of the windrow is indicated by numeral 61. This is adjustable by changing the length of the chain 74 that is attached at one end 76 to the draw bar 30 and at the other end 77 to the frame 42.

The universal joint comprises a U-shaped yoke on the first end of the frame 42, with two openings through which bolt 45 passes. This goes through a block 47, which has another opening in a horizontal direction through which a bolt 49 passes. The bolt 49 passes through holes in two support members 51, which are attached to plate 46, which is attached to the member 30 of the draw bar. This can be by means of bolts, or by clamps such as 48, for example, or any other desired manner. Further positioning of the tucker wheels is possible by positioning the plate 46 along the drawbar arms 30A, 30B.

Balers in present use for making large diameter cylindrical bales require that the operator back the baler up a few feet to discharge a completed bale. Since the tucker wheels are positioned to operate on forward movement of the baler they could be damaged if held in a fixed position when the baler is backed up. However, the provision of universal joints 44 permits the tucker wheels to caster, or pivot inwardly when the baler backs up so that they roll straight in the direction of movement of the baler. Thus, the universal joints 44 insure not only protection of the tucker wheels in permitting them to rise when on even ground or an object such as a stub or rock on the ground is encountered but also to pivot towards the baler tongue when the baler backs up.

Referring to FIG. 3, the tucker wheel indicated generally by the numeral 40 comprises a circular wheel 50 which may be a simple steel plate, which carries a stub shaft 52 which is supported on a circular flange 54 which can be attached by means of bolts, for example, to the wheel 50. The second end of the frame 42 carries a transverse cylindrical bearing 56 which is adapted to receive the stub shaft 52 of the wheel 50, and to lock it in the bearing, and permit it to freely rotate within the bearing housing 56. Of course any other manner of rotatably mounting of the wheel 50 with respect to the frame 42 can be used.

Along the periphery of the wheel 50 there are a large plurality of heavy wire spokes 58 which are more or less radially outwardly directed. They are attached by means of plates 60, and bolts 62, to the periphery of the wheel. There are short helical coils of spring wire between the attachment points and the spokes 58, so that there is considerable flexiblity of the spokes at or near the point of attachment. These spokes may be bent as illustrated or they can be more or less straight as desired. The line 26 in FIG. 3 illustrates the position of the surface of the earth, and indicates that the spring 79 and chain 80 are adjusted so that the arm 42 supports the wheel 40 such that there is a slight projection of the spokes into the earth.

As the vehicle moves in the direction of the arrow 28, the spokes of the wheels 50 will dig into the earth and the wheel will rotate in the direction of the arrow 25. Any hay lying on the ground surface 26 will be entrained by the spokes 58 and, as the wheel rotates farther, the hay will be carried upwardly and inwardly towards the center axis of the windrow indicated generally by the numeral 27, moving hay inwardly so that it is more evenly distributed as it enters the baler. As the wheel rotates the spokes will tend to follow along the lines parallel to the arrow 28, and as soon as they pull out of the contact with the earth they will be deflected back into the plane of the baler and, in moving transversely, will tend to throw the hay in towards the middle of the windrow.

There is a curved plate or push-off bar 70 which is attached by a rod 64 to a fixture 66 which attached to the frame 42 near its second end, such as by bolts 68. This plate or push-off bar is set at an angle so that its edge is parallel to the plane of the spokes. Its lower end 71 is closer to the circumference of the wheel 50 than its upper end 72 which extends beyond the ends of the spokes 58. Thus any hay that is entrained with the spokes, as they leave the earth 26 will, by brushing against the edge of the plate 70 be forced off of the spokes at the or near the point 72, which is substantially inside of the edges 36A, 36B of the final width of the windrow, which should be approximately width 18 of the collecting apparatus.

The provision of push-off bar 70 is important when it is considered that the diameters of tucker wheels 50 is limited. If a tucker wheel is of large diameter of several feet, hay easily falls off the tynes 58 as the wheel rotates. However, space limitation does not permit the use of large diameter wheels on present hay bales. The tucker wheel must be positioned in a critical relationship with the baler pickup mechanism—that is, near enough to augment the picking up of the hay and moving it into the baler. Therefore, smaller diameter tucker wheels must be employed. The provision of push-off bars 70 permits the use of tucker wheels of diameter within the space limitation of present balers while insuring that hay will not adhere to the wheels and accumulate on the periphery of the wheels.

It will be clear that for a given size of frame 42, the position of the wheel can be adjusted in angle by means of the chain 74, and in elevation by means of the chain 80. Its lateral position, that is, perpendicular to the axis 27, can be adjusted by clamping the plate 46 at a point farther to the front or to the rear along the arms 30a and 30b of the drawbar. Thus, complete flexibility is provided for positioning the tucker wheels so that they can effectively collect straw from a windrow wider than the working width 18 of the collection machinery.

What has been described is an apparatus comprising a pair of tucker wheels which are adapted to be mounted on a baler and to rotate in accordance with the longitudinal movement of the vehicle, and to entrain hay from the outer margins from the windrow and to deposit it within a selected width of the windrow which is substantially equal to the operating width of the collection machinery.

While the invention has been described as it is particularly adaptable to hay balers of the type which produce large diameter cylindrical bales, it can be seen that the principles of the invention may be employed or other types of agricultural machinery, such as combines used to combine beans or other crops which are first mowed and gathered into windrows for further processing. "Baler" and "hay baler" as used herein means any machine moved over the earth for processing cut crops. "Hay" as used herein means any cut crop of the type gathered into windrows for further processing.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. For use with a hay baler having means for picking up hay from a windrow on a field, the baler having a frame with a drawbar extending forwardly of the hay pickup means, the improvement providing apparatus for reducing the width of the windrow, comprising:

a pair of tucker wheels, each having a front and rear side and having a plurality of flexible wire spokes extending out beyond the circumference of the wheel;

a pair of V-shaped wheel supports having the inner ends attached to opposite sides of the baler drawbar by universal means permitting the wheel supports to move both vertically and horizontally, the outer end of each wheel support being rotatably attached to the rear side of a tucker wheel, the intermediate V portion of each wheel support extending forwardly of each tucker wheel in the forward direction of the baler, the point of attachment of the inner end of each wheel support being forward of the trailing edge of the tucker wheel rotatably secured to the wheel support;

adjustable means to limit the downward and rearward pivotation of each wheel support whereby as the baler moves forwardly the forward side of each tucker wheel is positioned at an outwardly inclined angle to either side and forward of the baler hay pickup means to move hay towards the path of the baler pickup means.

2. Apparatus for use with a hay baler according to claim 1 wherein said means of adjustably limiting the downward and rearward pivotation of each wheel support includes chains, one end of each of which is connected to the wheel support and the other end connected to the hay baler.

3. Apparatus for use with a hay baler according to claim 1 including means with each tucker wheel to remove entrained hay from said spokes.

4. Apparatus for use with a hay baler according to claim 1 wherein said means with each tucker wheel to remove entrained hay from said spokes comprises:

a rod having its forward end affixed to said wheel support, the rod extending parallel and spaced from said tucker wheel rear side; and a push-off plate affixed to the rod outer end, the push-off plate providing a curved, wide surface which is substantially planar in planes of the tucker wheel axis, the push-off plate being inclined at an angle relative to a radius of the tucker wheel, with the outward end of the plate spaced further from the tucker wheel axis than the outer end of the spokes, the plate being positioned adjacent the spokes whereby as the tucker wheel rotates, accumulated matter carried by the spokes is pushed off the spokes.

* * * * *

UNITED STATES PATENT AND TRADEMARK OFFICE
CERTIFICATE OF CORRECTION

PATENT NO. : 4,182,103
DATED : January 8, 1980
INVENTOR(S) : DARRELL A. MC NUT

It is certified that error appears in the above-identified patent and that said Letters Patent are hereby corrected as shown below:

The Title "WINDOW TUCKER WHEELS" should be

--WINDROW TUCKER WHEELS--

Signed and Sealed this

Thirteenth Day of May 1980

[SEAL]

Attest:

SIDNEY A. DIAMOND

*Attesting Officer*  *Commissioner of Patents and Trademarks*